United States Patent [19]

Kish

[11] Patent Number: 4,690,390

[45] Date of Patent: Sep. 1, 1987

[54] OVERRUNNING CLUTCH SPRING

[75] Inventor: Jules G. Kish, West Haven, Conn.

[73] Assignee: United Technologies Corporation, Hartford, Conn.

[21] Appl. No.: 910,333

[22] Filed: Sep. 19, 1986

Related U.S. Application Data

[63] Continuation of Ser. No. 660,332, Oct. 12, 1984, abandoned.

[51] Int. Cl.⁴ .................. F16F 1/06; F16D 13/04; B23P 13/00
[52] U.S. Cl. .................. 267/155; 29/173; 192/41 S
[58] Field of Search .......... 267/155, 166, 167; 72/138; 29/173, 20.1; 192/41 S, 89 R, 107 T; 409/131, 132

[56] References Cited

U.S. PATENT DOCUMENTS

| | | | |
|---|---|---|---|
| 1,553,515 | 9/1925 | Dennison | 192/41 S |
| 1,932,000 | 10/1933 | Starkey | 192/41 S |
| 1,934,790 | 11/1933 | Brownlee | 192/41 S |
| 1,952,415 | 3/1934 | Brownlee | 192/41 S |
| 1,983,824 | 12/1934 | Starkey | 192/41 S |
| 2,030,333 | 2/1936 | Starkey | 192/107 T |
| 2,336,757 | 12/1943 | Starkey | 192/41 S |
| 2,673,730 | 3/1954 | Hupp | 267/155 |
| 2,948,954 | 8/1960 | Ramsa | 29/173 X |

FOREIGN PATENT DOCUMENTS

| | | | |
|---|---|---|---|
| 0533191 | 8/1931 | Fed. Rep. of Germany | 29/173 |
| 0725984 | 3/1932 | France . | |
| 0255958 | 8/1926 | United Kingdom . | |

OTHER PUBLICATIONS

"Advanced Overrunning Clutch Technology", by Kish, SAE Technical Paper Series, Nov. 27-30, 1978.
USAAMRDL-TR-77-18 Government Report, "Helicopter Freewheel Unit Design Guide", Kish, Oct. 1977, pp. 54-81.

Primary Examiner—Andres Kashnikow
Assistant Examiner—Robert J. Oberleitner
Attorney, Agent, or Firm—Gerald E. Linden

[57] ABSTRACT

Increased thickness for the center two coils of an overrunning clutch spring is achieved by gradually increasing the lead a few degrees before and after the central crossover point (25). This affects the centrifugal balance of the spring less than an abrupt increase in thickness at the crossover point (25).

4 Claims, 8 Drawing Figures

OVERRUNNING CLUTCH SPRING

The Government has rights in this invention pursuant to Contract No. DAAK51-82-C-0046 awarded by the Department of the Army.

CROSS REFERENCE TO RELATED APPLICATIONS

This is a continuation of application Ser. No. 660,332, filed on Oct. 12, 1984 and now abandoned.

Cross reference is made herein to copending, commonly-owned U.S. patent application Ser. No. 660,335, now U.S. Pat. No. 4,570,318, entitled OVERRUNNING CLUTCH SPRING, filed on even date herewith by Kish.

DESCRIPTION

1. Background of the Invention

High-torque overrunning clutches allow for autorotation in helicopters and permit operation with one engine driving and the other shut down. One type of overrunning clutch utilizes a spring which expands radially under a driving load to couple two coaxial clutch members.

2. Disclosure of the Invention

According to the invention, increased thickness for the center two coils of an overrunning clutch spring is achieved by gradually increasing the lead a few degrees before and after the central crossover point (25). This affects the centrifugal balance of the spring less than an abrupt increase in thickness at the crossover point (25).

BEST MODE FOR CARRYING OUT THE INVENTION

Figure 1:
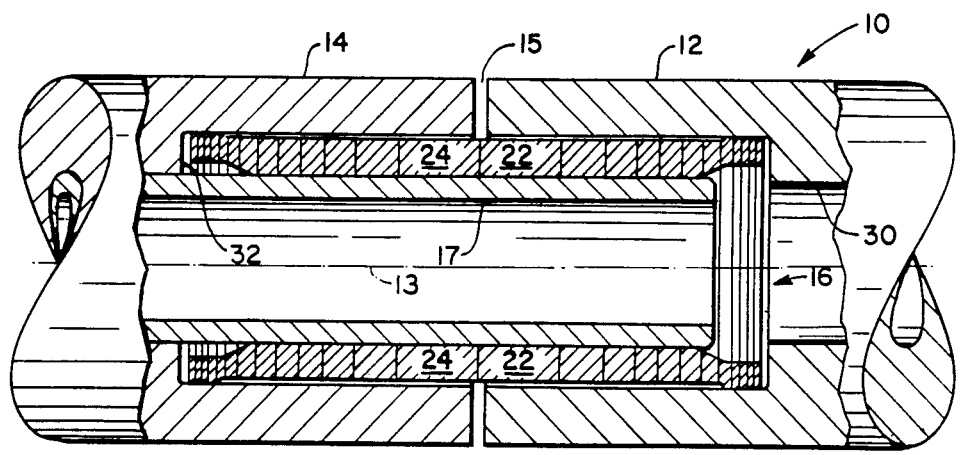
FIG. 1 is a side, partial cutaway view of a spring clutch, for which the spring of this invention is intended.

In FIG. 1 is shown an overrunning clutch 10 having a cylindrical input member 12 and a cylindrical output member 14 in coaxial (axis 13), end-to-end juxtaposition, with a gap 15 therebetween. The inner diameters (ID) of the clutch members 12 and 14 are constant and identical in a region wherein there is disposed a clutch spring 16, which is shown in an isolated perspective view in FIG. 2. The outside diameter (OD) of the spring 16 is greatest at the ends and smaller in a central portion. The ends are in radial contact with the ID of the clutch members 12 and 14, and there is a clearance between the spring 16 and the ID of the clutch members 12 and 14 in the central portion of the spring 16, which is exaggerated in FIG. 1. When the input member 12 rotates faster than the output member 14, and in a direction counter to the pitch of the spring coils, the spring 16 expands radially so that it is in driving contact with the ID of the clutch members 12 and 14 along its entire length to drive torque therebetween. In the overrunning condition, the faster rotation of the output member 14, in the diretion of the spring pitch, tends to radially contract the spring, thereby disengaging the drive. An arbor 17 is provided inside of the spring 16 to position it in the overrunning state. This is shown in U.S. Pat. No. 1,934,790 (Brownlee, 1933), entitled OVERRUNNING SPRING CLUTCH; U.S. Pat. No. 1,952,415 (Brownlee, 1934), entitled OVERRUNNING CLUTCH; and in SAE Technical Paper No. 781039 (Kish, 1978).

Figure 2:
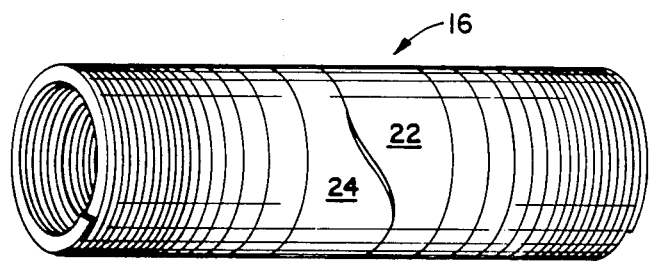
FIG. 2 is a perspective view of the spring of this invention in its compressed state.

As is best viewed in FIG. 2, the first few coils at either end are of constant thickness, but the thickness, or pitch, of the coils increases exponentially towards the center of the spring 16, with the center two coils 22 and 24 being the thickest. This is for constant stress, as described in Report No. USAAMRDL-TR-77-18, entitled HELICOPTER FREEWHEEL UNIT DESIGN GUIDE (Kish, 1977) at pp 54–81. Nonuniform coil thicknesses are disclosed in U.S. Pat. No. 1,932,000 (Starkey, 1933), entitled CLUTCH SPRING, and U.S. Pat. No. 1,983,824 (Starkey, 1934), entitled SPRING CLUTCH.

Figure 3:
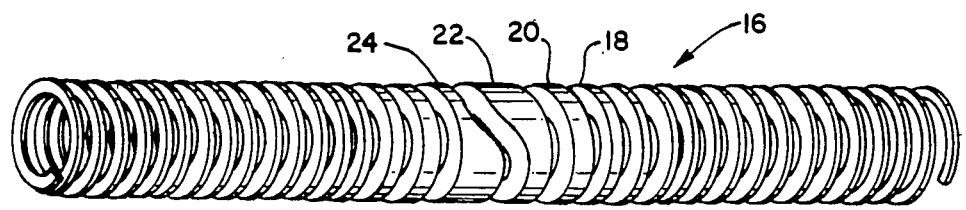
FIG. 3 is a perspective view of the spring of this invention in its precompressed state.
Figure 4A:
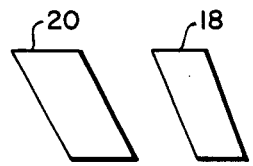
FIG. 4 is a schematic of the coils of the spring of this invention, in their precompressed (A) and compressed (B) states.
Figure 4B:
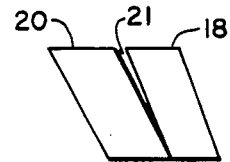

The spring 16 is manufactured in a "precompressed" state, as shown in FIG. 3. The technique is similar to machining a thread and includes rotating tube stock and axially advancing an end mill to cut the coils. The "lead" of the end mill determines the pitch of the coils. The spring is then compressed and heat-treated so that the coils remain touching. The exponentially increasing pitch results in a space between adjacent coils in the compressed state. Consider the adjacent coils 18 and 20. FIG. 4A shows the coils 18 and 20 in their precompressed state. From right to left, as viewed, the pitch of the coils increases towards the center of the spring. When the coils 18, 20 are compressed, as shown in FIG. 4B, there is a space 21 between the coils 18, 20, which causes the spring to bend slightly when compressed. However, the bend is eliminated in the final machining steps, such as grinding.

CENTRAL CROSSOVER GAP

Maximizing the thickness (width) of the two center coils 22, 24 increases the load capacity of the spring. However, spring length is limited. Therefore, it is known to abruptly increase the thickness of the center coils 22, 24 at a center crossover point (axial midpoint of the spring) in the following manner.

Figure 5A:
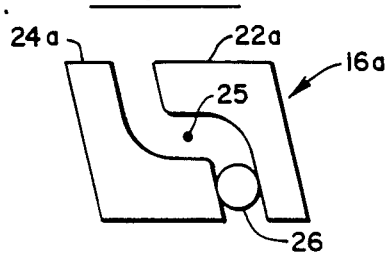
FIG. 5 is a schematic of the central crossover coils of a prior art spring, in their precompressed (A) and compressed (B) states.
Figure 5B:
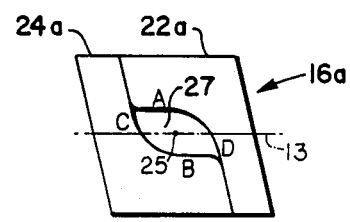

FIG. 5A shows the center coils 22a and 24a of the spring 16a in their precompressed state. At the center crossover point 25, where the coils go from increasing thickness to decreasing thickness, an axial cut is made which abruptly increases the thickness of the coils 22a, 24a. In other words, envisioning the manufacturing process, a cutter 26 is axially fed along the rotating tube stock until it reaches the crossover point 25 whereat the rotation of the tube stock ceases so that an axial cut, rather than a pitched cut is made. As shown in FIG. 5B, which represents the spring 16a in its compressed state, the abrupt increase in coil thickness results in a gap 27 at the central crossover point. The dimensions of the gap 27 are related to the length of the axial cut and the diameter of the cutter 26.

The central crossover gap 27 represents an imbalance which can be consequential at high RPM, such as when the spring clutch is on the output shaft of a turbine engine. For instance, a gap measuring 0.43 inches (axial cut) by 0.25 inches (cutter diameter) by 0.28 inches (material thickness), in a spring having a radius of 0.60 inches, would generate a centrifugal imbalance in excess of one hundred thirty pounds at 30,000 RPM. This is not acceptable in the context of an overrunning clutch on the turbine output shaft in a helicopter, and provides an impetus for reducing the imbalance by shrinking the gap and/or offsetting the imbalance. Using a smaller cutter would reduce one dimension of the gap, but would compromise tool strength and life. Drilling holes opposite the crossover gap would compromise coil strength.

Figure 6A:
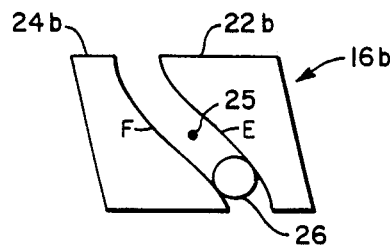
FIG. 6 is a schematic of the central crossover coils of the spring of this invention, in precompressed (A) and compressed (B) states.
Figure 6B:
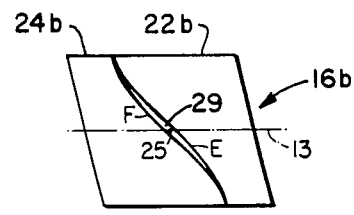

In FIG. 6A is shown the center coils 22b, 24b of a spring 16D in its precompressed state. Rather than abruptly increasing the coil thickness, the thickness is gradually increased at a rate greater than the exponential rate in a region extending from 45 degrees before to 45 degrees after the crossover point 25. As shown in FIG. 6B, the compressed spring 16b has a much smaller crossover gap 29 than that of the previous example (27), yet the net increase in central coil thickness is the same.

The gap 29 measures one-fourth of the spring circumference (i.e. ninety degrees) by 0.05 inches at the crossover point 25, and results in a centrifugal imbalance of less than ten pounds at 30,000 RPM.

Figure 6C:
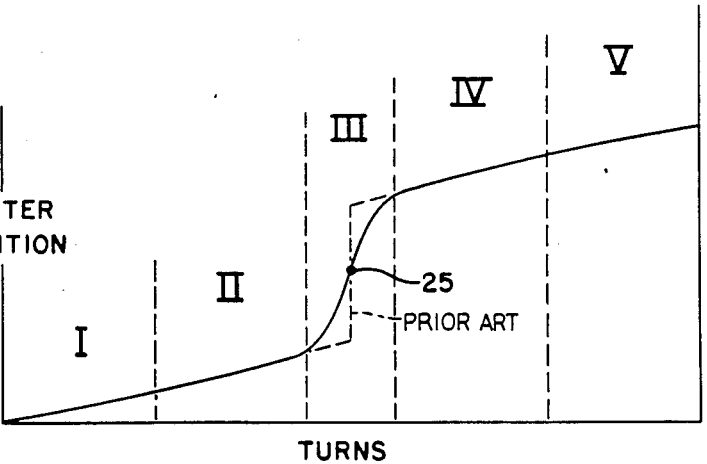

FIG. 6C shows cutter position versus spring rotation (turns) for the spring of this invention. For the end coils, the cutter is fed in axially at a constant rate (lead) in a region I. Then, the lead is exponential in a region II that extends to forty-five degrees, or one-eighth turn before the center crossover point 25. In a region III that extends from forth-five degrees before the crossover point 25 to forty-five degrees after the crossover point 25, the lead is a sine function that is tailored to blend into the exponential function of region II. Region IV is the mirror image of Region II, and Region V is the mirror image of Region I for the other half of the spring. The prior art technique that results in the spring 16a of FIG. 5 is shown in dotted lines.

SQUARED ENDS

As shown in FIG. 1, the clutch members 12 and 14 have shoulders 30 and 32 on the ID that abut the spring end faces. When the end coils are cut on a helix corresponding to a lead equal to the first coil width, as shown in FIG. 3, the end faces are not perpendicular to the spring axis. Therefore, any tendency for rubbing between the end faces of the spring and the shoulders 30, 32 is concentrated at the extreme end of the first coil of each end, resulting in a tendency for the spring to skew during overrunning, point contact on the end coils during repeated load and wear, and nonuniform distribution of axial load. By "squaring-off" the coil ends, these problems would be eliminated. Simply grinding the end of the spring flat results in an end coil of diminishing (to zero) thickness, as shown in U.S. Pat. No. 2,673,730 (Hupp, 1954), entitled SPRING FOR SPRING CLUTCHES, and is not an acceptable solution to these problems.

Figure 7A:
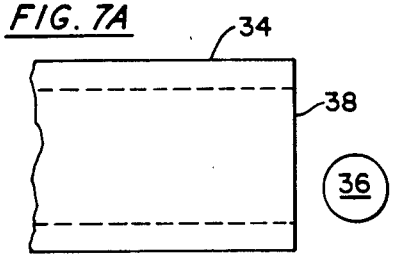
FIGS. 7A–7G are side views illustrating the manufacturing technique for a clutch spring.
Figure 7B:
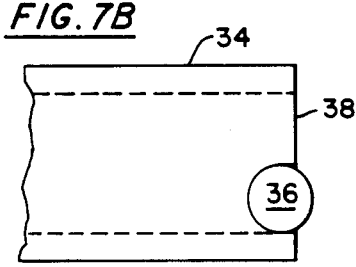
Figure 7C:
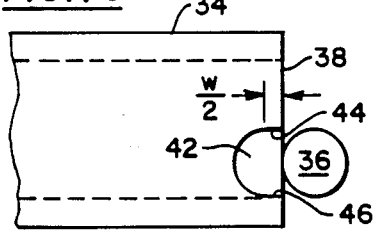

FIGS. 7A-7G illustrate a technique for manufacturing a spring with squared ends. The tube stock 34 for a spring 16C is shown in FIG. 7A. A cutter, such as an end mill 36 having a diameter (D), cuts radially into the tube stock 34. As shown in FIG. 7B, the cutter 36 is axially fed into the nonrotating tube stock 34 from an end 38 a distance equal to D/2+W/2, where (W) is the desired width of an end coil 40. This results in a notch 42 having edges 44 and 46 that are square with respect to the end 38 of the tube stock 34 for a distance of W/2, as shown in FIG. 7C.

Figure 7D:
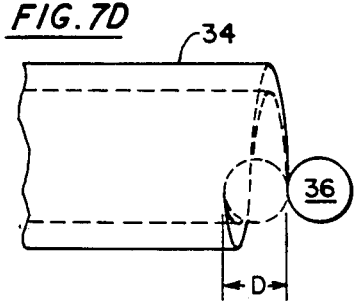

An end coil is cut in the tube stock by positioning the cutter 36 tangent to the end of the tube stock 34, and simultaneously axially feeding the cutter 36 into the tube stock 34 and rotating the tube stock one turn so that the cutter 36 ends up in the position shown in phantom in FIG. 7D. The first or "end" coil is cut with a lead equal to the cutter diameter.

Figure 7E:
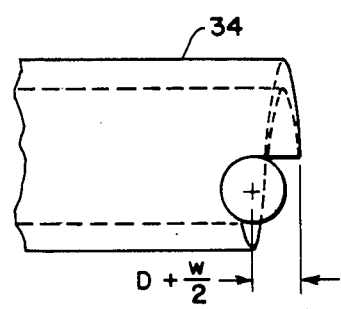

The cutter 36 is then fed axially towards the center of the spring, without rotating the tube stock, a distance equal to W/2, as shown in FIG. 7E. Then the cutting process resumes by rotating the tube stock 34 and axially feeding the cutter 36 towards the opposite end of the tube stock 34 (not shown). The lead for these subsequent coils is equal to the cutter diameter plus the coil width.

Figure 7F:
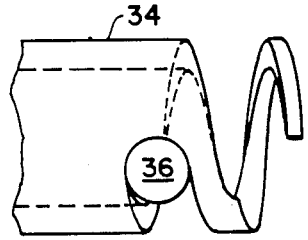

As shown in FIG. 7F, this results in an end coil that varies in thickness from W/2 to 3W/2, for an average thickness of (W). As discussed hereinbefore with reference to FIG. 3, the end coils are of constant thickness, and towards the center of the spring the feed rate is increased so that the coil thickness increases exponentially.

Figure 7G:
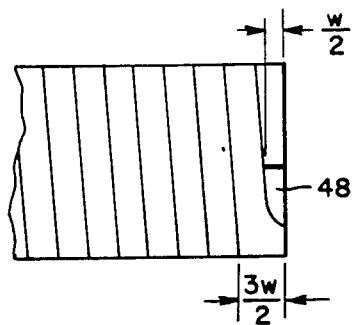

When the spring 16C is compressed, as shown in FIG. 7G, the end 38 is flat and perpendicular to the spring axis, which addresses the problems discussed hereinbefore. However, there is a notch 48 at the end of the spring 16c as a result of "squaring off" the ends. As with the center gap discussed previously, the end notches 48 create an imbalance in the spring.

It should be understood that the steps illustrated in FIGS. 7B and 7E could be combined.

BALANCING THE SPRING

As described hereinbefore, reducing the crossover gap results in a centrifugal imbalance of less than ten pounds at 30,000 RPM. It is desirable to further reduce the imbalance.

Figure 8:
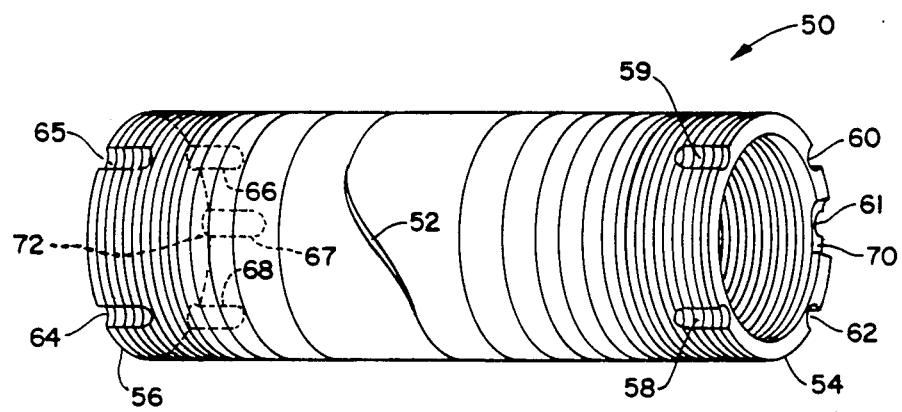
FIG. 8 is a perspective view of the clutch spring of this invention.

In FIG. 8 is shown a clutch spring 50 combining the features of minimizing the central crossover gap 52 and squaring-off the ends 54 and 56. An additional feature of the spring 50 is that there are recesses 58-62 disposed in the end 54, and corresponding recesses 64-68 in the end 56. The recesses 58-68 are for lubrication on the ends of the spring 50 that are in slipping engagement with the clutch members during overrunning. The placement of the recesses 58-68 around the circumference of the spring is not critical, and it is sufficient that there are at least a few disposed more-or-less evenly about the circumference. The recesses 58-68 represent missing material which will create a spring imbalance. However, by advantageously locating the recesses 58-68 and the end notches 70 and 72, imbalance caused by the center crossover gap 52 can be corrected. Consider the following example.

The crossover gap 52 spans plus and minus forty-five degrees from a nominal "center" at zero azimuth. As discussed hereinbefore with reference to FIG. 6, the gap 52 causes a centrifugal imbalance of, for example, nine pounds at 30,000 RPM.

It is a relatively simple matter to locate the end notches 70, 72 associated with squaring-off the ends 54, 56 at any azimuth, without signficantly affecting the overall length of the spring 50. For this example, the notches 70, 72 are located at one hundred eighty degrees from the central crossover point. This nearly compensates for the imbalance created by the crossover gap 52.

A symmetric distribution of oil notches around the azimuth would have no net effect on centrifugal imbalance. Therefore, the oil notches 58–68 are slightly non-symmetrically distributed around the azimuth to correct for any remaining imbalance. In this example, the slots 58, 59 and 64, 65 are located at +/− forty-five degrees from the crossover point, the slots 60, 62 and 66, 68 are located at +/− one hundred twenty-seven degrees from the crossover point, and the slots 61 and 67 are located at one hundred eighty degrees opposite the crossover point. This results in virtually no centrifugal imbalance.

What is claimed is:

1. A method of manufacturing an overrunning clutch spring having a center crossover point from tube stock, comprising:
   rotating the tube stock;
   axially feeding a cutter along the rotating tube stock at an exponential rate until a position before the center crossover point; and
   continuing to axially feed the cutter along the rotating tube stock from the position before the center crossover point to the center crossover point at greater than the exponential rate.

2. A method according to claim 1 wherein the position is 45 degrees before the center crossover point.

3. A method according to claim 1 wherein the cutter is fed along the rotating tube stock at a rate related to a sine function between the position before the center crossover point and the center crossover point.

4. A method according to claim 1 wherein a sine function rate blends into the exponential rate at the point before the center crossover point.

* * * * *